US012368274B2

(12) United States Patent
Haile et al.

(10) Patent No.: US 12,368,274 B2

(45) Date of Patent: Jul. 22, 2025

(54) CONNECTOR PROCESSING MACHINE

(71) Applicant: TE Connectivity Solutions GmbH, Schaffhausen (CH)

(72) Inventors: Kellen Haile, Middletown, PA (US); Sun Kyu Pak, Harrisburg, PA (US); Craig S. Roper, Mount Joy, PA (US); Edward T. Price, III, Mechanicsburg, PA (US); David D. Wiltraut, Palmyra, PA (US); Swapnilsinh Solanki, Harrisburg, PA (US)

( * ) Notice: Subject to any disclaimer, the term of this patent is extended or adjusted under 35 U.S.C. 154(b) by 406 days.

(21) Appl. No.: 18/083,882

(22) Filed: Dec. 19, 2022

(65) Prior Publication Data

US 2024/0204468 A1 Jun. 20, 2024

(51) Int. Cl.
*H01R 43/16* (2006.01)

(52) U.S. Cl.
CPC .................................. *H01R 43/16* (2013.01)

(58) Field of Classification Search
CPC ...................................................... H01R 43/16
USPC ......................................................... 439/852
See application file for complete search history.

(56) References Cited

U.S. PATENT DOCUMENTS

| | | | | |
|---|---|---|---|---|
| 5,839,337 A * | 11/1998 | Neu | B26D 7/018 83/418 |
| 10,160,078 B2 * | 12/2018 | Podiebrad | B23Q 1/017 |
| 2002/0152854 A1 * | 10/2002 | Sheaffer | B26D 7/32 83/485 |
| 2005/0097731 A1 * | 5/2005 | Miyoshi | H01R 43/052 29/748 |

FOREIGN PATENT DOCUMENTS

| | | | |
|---|---|---|---|
| CN | 216152547 U * | 4/2022 | |
| CN | 216422640 U * | 5/2022 | |
| WO | WO-9748531 A1 * | 12/1997 | B23D 45/10 |

* cited by examiner

*Primary Examiner* — Peter G Leigh

(57) ABSTRACT

A connector processing machine includes a feeder mechanism having a housing track for supporting connector housings between a loading zone and a punching zone. The feeder mechanism includes a feeder rail and a carriage sliding along the feeder rail by a feeder actuator between a pickup position and a drop off position. The feeder mechanism includes a walking beam movable by the carriage between the loading zone and the punching zone. The walking beam includes fingers configured to engage the connector housings to advance the connector housings. The connector processing machine includes a punch assembly having a cutter assembly coupled to the walking beam and movable with the walking beam with cutters configured to cut housing runners between the connector housings to separate the connector housings from each other.

20 Claims, 9 Drawing Sheets

CONNECTOR PROCESSING MACHINE

BACKGROUND OF THE INVENTION

The subject matter herein relates generally to connector processing machines.

Electrical connectors are assembled using multiple processing machines at various stations. Some known systems mold connector housings into housing sticks with housing runners and cover runners between the connector housings and the covers, respectively. The sticks are first fed to a machine including a housing runner cutter to remove the housing runner. The sticks are then fed to a machine including a cover runner cutter to remove the cover runner. The housing runners and the cover runners are cut and removed before inserting contacts into the housings and closing the covers to complete the assembly. The multiple processing steps is time consuming. The housings vary in size, ranging from single position to multiple positions. Different machines are typically provided for the different sized connectors. Providing multiple machines to perform the various steps is expensive.

A need remains for a connector processing machine and method for assembling electrical connectors in a cost effective and reliable manner.

BRIEF DESCRIPTION OF THE INVENTION

In one embodiment, a connector processing machine for processing connector housings of connector assemblies is provided. The connector processing machine includes a platform having a punching zone. The connector processing machine includes a feeder mechanism coupled to the platform. The feeder mechanism includes a housing track for supporting and guides the connector housings between a loading zone and the punching zone. The feeder mechanism includes a feeder rail and a carriage sliding along the feeder rail. The feeder mechanism includes a feeder actuator coupled to the carriage to slide the carriage along the feeder rail between a pickup position and a drop off position. The feeder mechanism includes a walking beam coupled to the carriage and movable by the carriage between the loading zone and the punching zone. The walking beam includes fingers configured to engage the connector housings to advance the connector housings along the housing track from the loading zone to the punching zone. The connector processing machine includes a punch assembly coupled to the platform at the punching zone. The punch assembly includes a cutter assembly and an actuator operably coupled to the cutter assembly. The cutter assembly is coupled to the walking beam and movable with the walking beam. The cutter assembly includes cutters configured to cut housing runners between the connector housings to separate the connector housings from each other.

In another embodiment, a connector processing machine for processing connector housings of connector assemblies is provided. The connector processing machine includes a platform having a center mounting plate includes a punching zone above the center mounting plate. The connector processing machine includes a feeder mechanism coupled to the platform. The feeder mechanism includes a housing track for supporting and guides the connector housings between a loading zone and the punching zone. The feeder mechanism includes a feeder rail and a carriage sliding along the feeder rail. The feeder mechanism includes a feeder actuator coupled to the carriage to slide the carriage along the feeder rail between a pickup position and a drop off position. The feeder mechanism includes a walking beam coupled to the carriage and movable by the carriage between the loading zone and the punching zone. The walking beam includes fingers configured to engage the connector housings to advance the connector housings along the housing track from the loading zone to the punching zone. The connector processing machine includes a housing runner punch assembly at the punching zone. The housing runner punch assembly includes a housing runner cutter assembly and a housing runner actuator operably coupled to the housing runner cutter assembly. The housing runner cutter assembly is coupled to the walking beam and movable with the walking beam. The housing runner cutter assembly includes housing runner cutters configured to cut housing runners between the connector housings to separate the connector housings from each other. The connector processing machine includes a cover runner punch assembly at the punching zone. The cover runner punch assembly includes a cover runner cutter assembly and a cover runner actuator operably coupled to the cover runner cutter assembly. The cover runner cutter assembly includes cover runner cutters configured to cut cover runners between covers of the connector housings to separate the covers from each other.

In a further embodiment, a method of processing connector assemblies having connector housings with covers connected by housing runners and cover runners is provided. The method loads batches of the connector housings onto a housing track at a loading zone. The method moves a walking beam to the loading zone and engaging the connector housings with fingers of the walking beam and moves a carriage supporting the walking beam on a feeder rail from the loading zone to a punching zone. The method cuts the cover runners from between the covers using a cover runner punch assembly to separate the covers from each other and cuts the housing runners from between the connector housings using a housing runner punch assembly to separate the connector housings from each other.

DETAILED DESCRIPTION OF THE INVENTION

Figure 1:
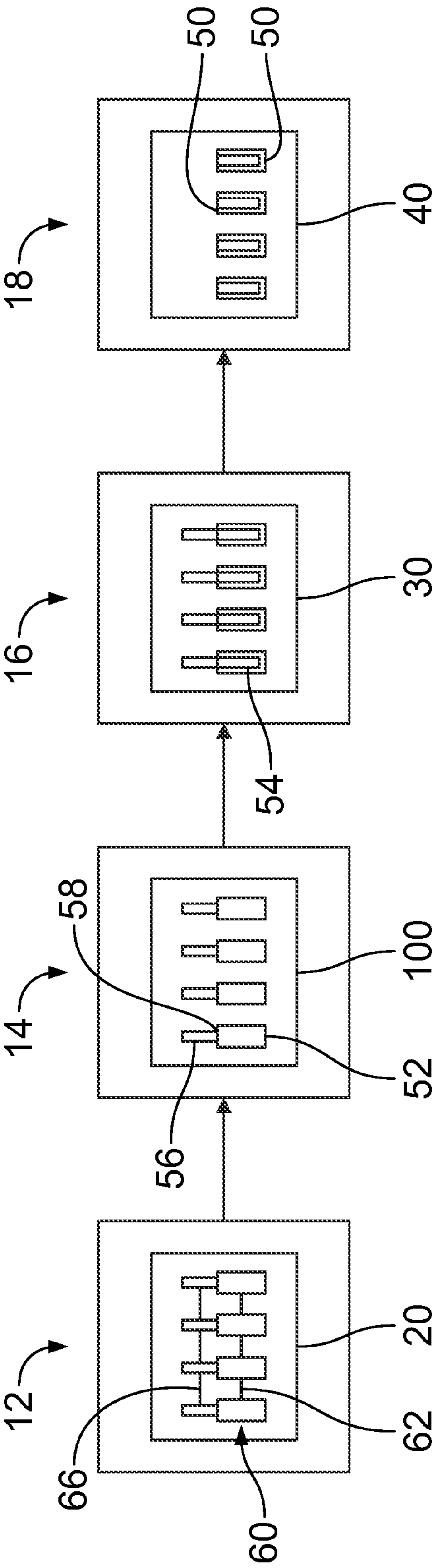
FIG. 1 is a schematic view of a connector manufacturing system 10 in accordance with an exemplary embodiment for manufacturing electrical connectors.
Figure 2A:
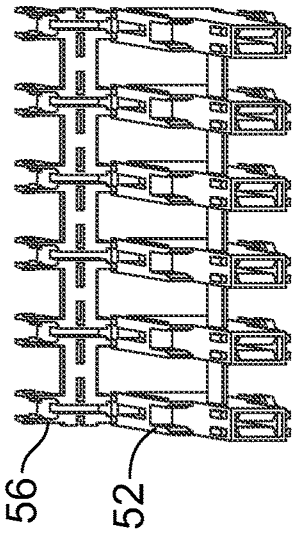
FIG. 2A illustrates six, single-position units molded together and connected by housing runners and cover runners in accordance with an exemplary embodiment.
Figure 2B:
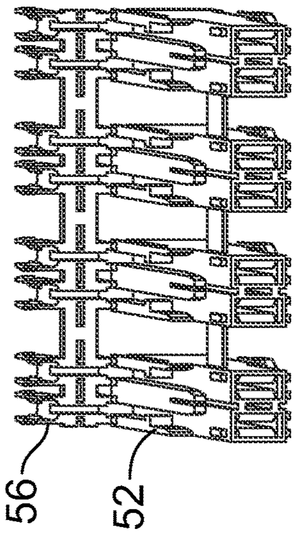
FIG. 2B illustrates four, two-contact multi-position units molded together and connected by housing runners and cover runners in accordance with an exemplary embodiment.
Figure 2C:
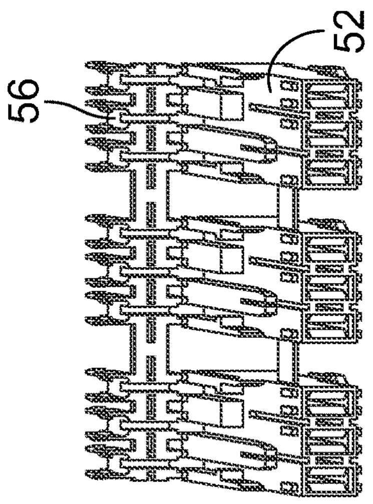
FIG. 2C illustrates three, three-contact multi-position units molded together and connected by housing runners and cover runners in accordance with an exemplary embodiment.
Figure 2D:
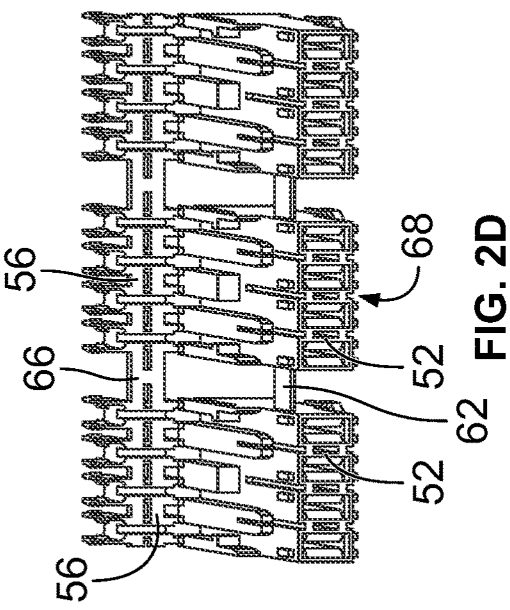
FIG. 2D illustrates three, four-contact multi-position units molded together and connected by housing runners and cover runners in accordance with an exemplary embodiment.
Figure 2E:
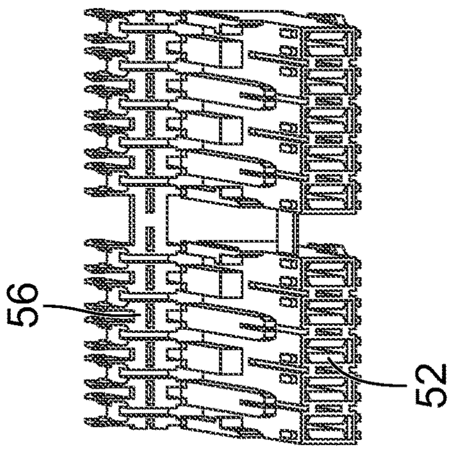
FIG. 2E illustrates two, five-contact multi-position units molded together and connected by housing runners and cover runners in accordance with an exemplary embodiment.
Figure 2F:
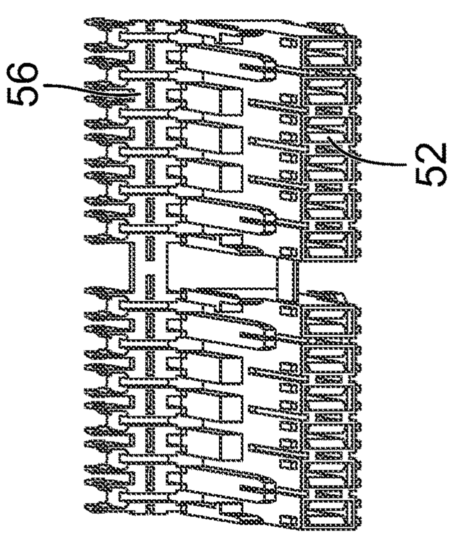
FIG. 2F illustrates two, six-contact multi-position units molded together and connected by housing runners and cover runners in accordance with an exemplary embodiment.

FIG. 1 is a schematic view of a connector manufacturing system 10 in accordance with an exemplary embodiment for manufacturing electrical connectors 50. The electrical connectors 50 may be power connectors or data connectors. The electrical connectors 50 may be receptacle connectors in various embodiments. The electrical connectors 50 may be plug connectors in other various embodiments.

Each electrical connector 50 includes a connector housing 52 holding at least one contact 54 in a cavity of the connector housing 52 and having at least one cover 56 that closes the cavity after the contact(s) 54 are loaded into the connector housing 52. The cover(s) 56 may be connected to the connector housing 52 by a corresponding hinge(s) 58. Each contact 54 may be terminated to an end of a cable. In various embodiments, the contacts 54 are socket contacts; however, other types of contacts may be used in alternative embodiments, such as pin contacts, blade contacts, spring beam contacts, or other types of contacts.

The connector manufacturing system 10 includes a plurality of connector processing stations. The electrical connector 50 is processed at the various stations. In the illustrated embodiment, the connector manufacturing system 10 includes a first connector processing station 12, a second connector processing station 14, a third connector processing station 16, and a fourth connector processing station 18. The components of the electrical connector 50 are transferred between the various stations. Greater or fewer stations may be provided in alternative embodiments for processing the electrical connectors 50.

The first connector processing station 12 includes a connector housing molding machine 20 used to mold the connector housings 52 and the covers 56 with the hinges 58 between the connector housings 52 and the covers 56. In an exemplary embodiment, a plurality of the connector housing 52 are molded together during a common molding process as batches or housing sticks 60 of connector housings 52. Sacrificial housing runners 62 are molded between the connector housings 52 and sacrificial cover runners 66 are molded between the various covers 56. The housing runners 62 and the cover runners 66 are removable to separate the connector housings 52 from each other during a processing step at one of the various stations of the connector manufacturing system 10. Optionally, the connector housings 52 may be multi-position units 68 (shown in FIG. 2). The connector housings 52 of the multi-position units 68 receive multiple contacts 54. However, other connector housings 52 may be single-position units 68 (shown in FIG. 2), wherein each connector housing 52 receives a single contact 54.

In an exemplary embodiment, the second connector processing station 14 includes a connector processing machine 100 used to remove the housing runners 62 and the cover runners 66 and separate the connector housings 52 and the covers 56 from other connector housings 52 and covers 56. The connector processing machine 100 includes a punch assemblies operated to cut through the housing runners 62 and the cover runners 66 and separate the connector housings 52 and the covers 56. In an exemplary embodiment, the connector processing machine 100 quickly and efficiently removes the housing runners 62 and the cover runners 66, such as nearly simultaneously.

The third connector processing station 16 includes a contact loading machine 30 configured to load the contacts 54 into the connector housing 52. The contacts 54 may be rear loaded into the connector housings 52 in various embodiments. Optionally, the cables may be terminated to the contacts 54 at the third connector processing station 16, such as immediately prior to loading the contacts 54 (with the cables) into the connector housings 52.

The fourth connector processing station 18 includes a cover closing machine 40 configured to close the cover 56 onto the connector housing 52. For example, the cover 56 may be rotated to a closed position at the hinge 58. The cover 56 is coupled to the connector housing 52 to close the cavity and hold the contact 54 in the cavity.

FIG. 2 illustrates a plurality of different types of connector housing units that may be manufactured using the connector manufacturing system 10. FIG. 2A illustrates six, single-position units 68 molded together and connected by housing runners 62 and cover runners 66. FIG. 2B illustrates four, two-contact multi-position units 68 molded together and connected by housing runners 62 and cover runners 66. FIG. 2C illustrates three, three-contact multi-position units 68 molded together and connected by housing runners 62 and cover runners 66. FIG. 2D illustrates three, four-contact multi-position units 68 molded together and connected by housing runners 62 and cover runners 66. FIG. 2E illustrates two, five-contact multi-position units 68 molded together and connected by housing runners 62 and cover runners 66. FIG. 2F illustrates two, six-contact multi-position units 68 molded together and connected by housing runners 62 and cover runners 66. The housing runners 62 and the cover runners 66 are removable, such as at the connector processing machine 100 (shown in FIG. 3).

In the illustrated embodiment, the connector housings 52 are receptacle housings having receptacles at front or mating ends of the receptacle housings. The covers 56 are provided at the rear ends of the connector housings 52 and are configured to close the rear ends after the contacts are loaded into the connector housings 52. Other types of connector housings may be used in alternative embodiments, such as plug housings.

Figure 3:
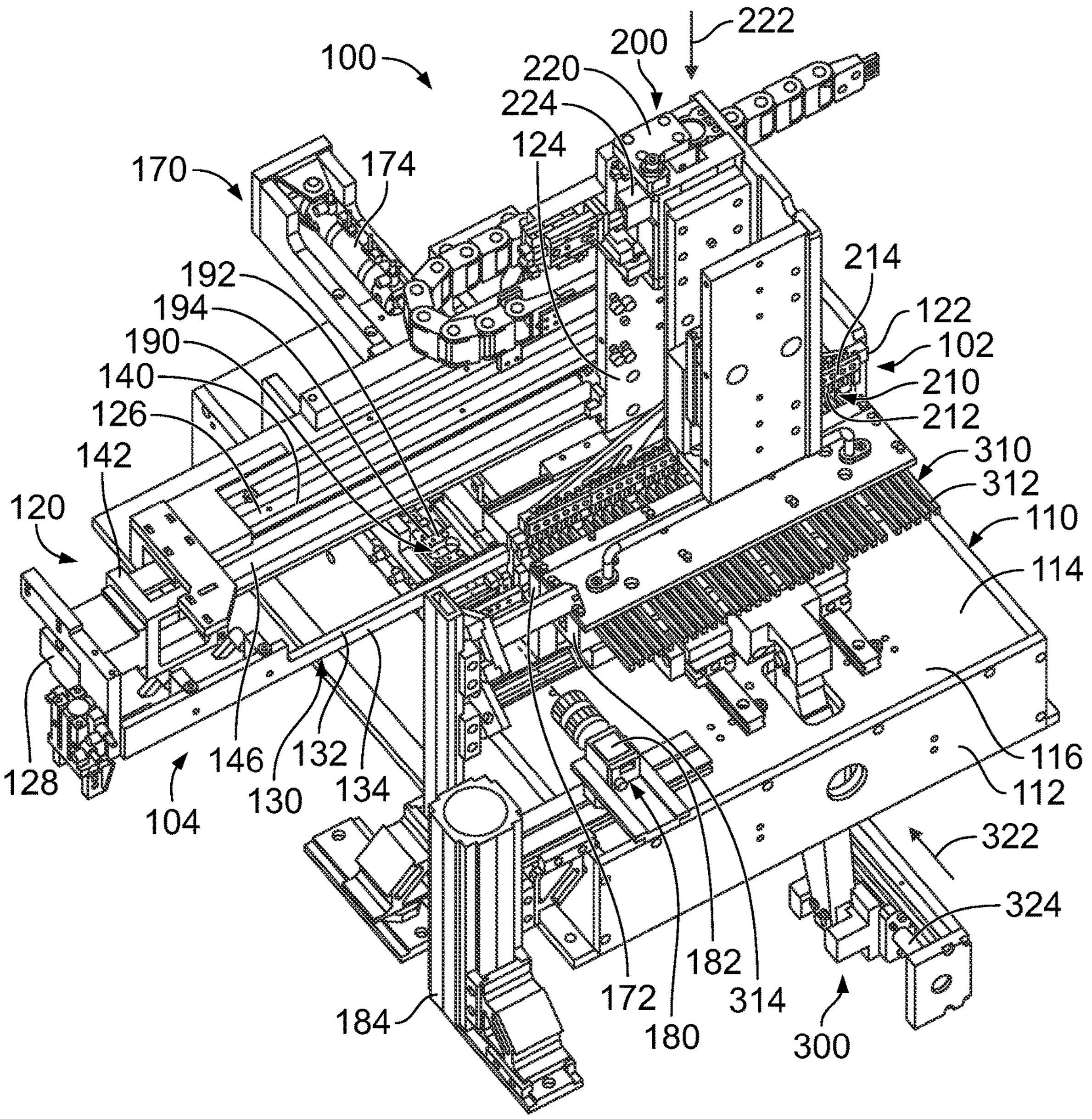
FIG. 3 is a top perspective view of the connector processing machine in accordance with an exemplary embodiment.
Figure 4:
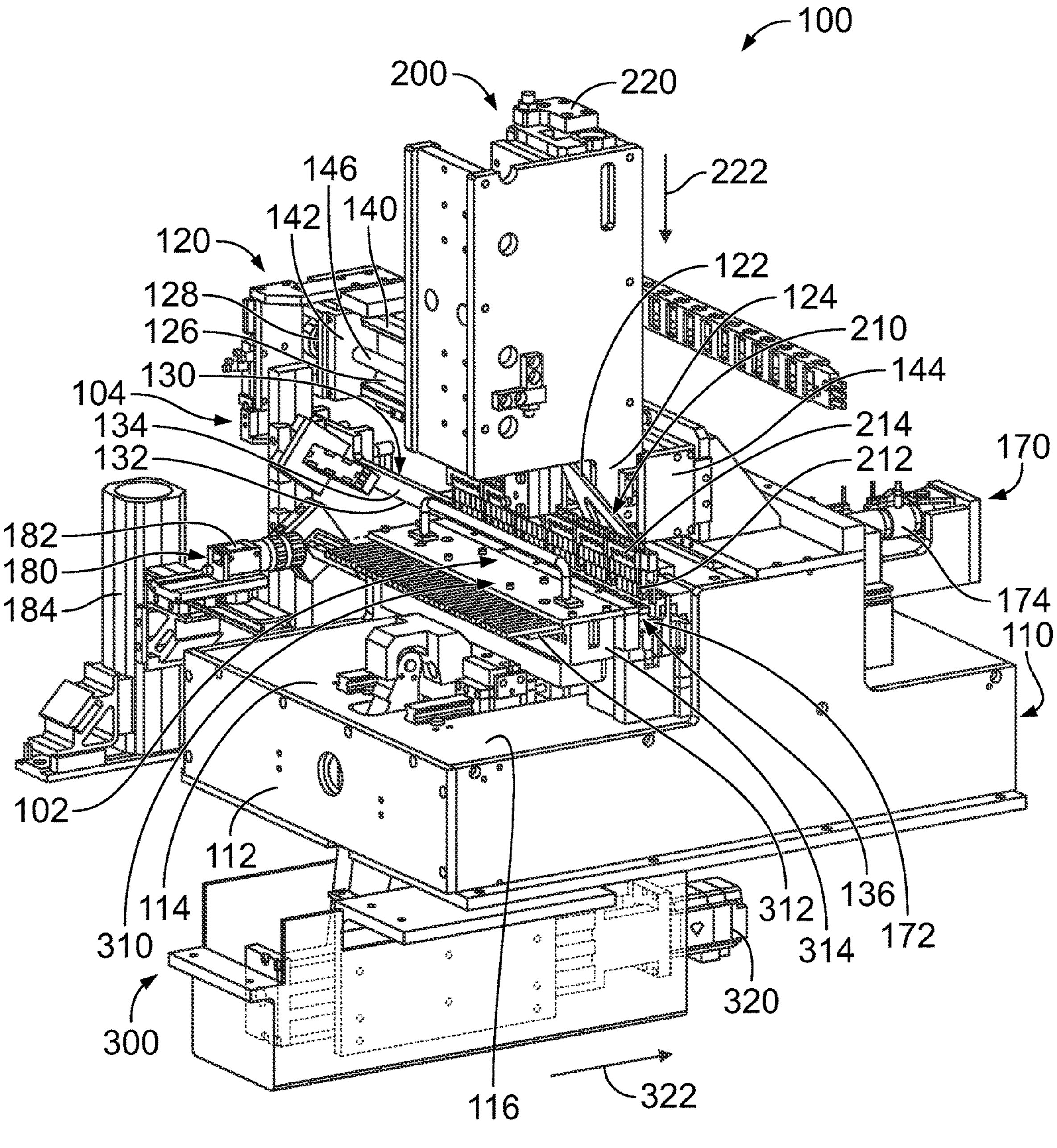
FIG. 4 is a top perspective view of the connector processing machine in accordance with an exemplary embodiment.

FIG. 3 is a top perspective view of the connector processing machine 100 in accordance with an exemplary embodiment. FIG. 4 is a top perspective view of the connector processing machine 100 in accordance with an exemplary embodiment. The connector processing machine 100 is used to remove the housing runners 62 and the cover runners 66 to singulate the connector housings 52 and the covers 56 at a punching zone 102 of the connector processing machine 100. The housing sticks 60 are presented at a loading zone 104 and transported from the loading zone 104 to the punching zone 102. The singulated connector housings 52 and covers 56 are removed from the punching zone 102, after removal of the housing runners 62 and the cover runners 66, such as for further processing at another processing station.

The connector processing machine 100 includes a platform 110 supporting other components of the connector processing machine 100. In an exemplary embodiment, the platform 110 includes a frame 112 supporting a center mounting plate 114. The components of the connector processing machine 100 may be mounted to the frame 112 and/or the center mounting plate 114. For example, the components may be mounted to an upper surface 116 of the center mounting plate 114. The punching zone 102 is located above the upper surface of the center mounting plate 114. Optionally, the platform 110 may include a cabinet (not shown) surrounding the components and the center mounting plate 114.

The connector processing machine 100 includes a feeder mechanism 120, a housing runner punch assembly 200, and a cover runner punch assembly 300. The feeder mechanism 120 is used to feed the connector housings 52 between the loading zone 104 and the punching zone 102. The housing runner punch assembly 200 is used to remove the housing runners 62 from between the connector housing 52. The cover runner punch assembly 300 is used to remove the cover runners 66 from between the covers 56. In an exemplary embodiment, the connector processing machine 100 includes a die assembly 170 for holding the connector housings 52 and the covers 56 in the punching zone 102. In an exemplary embodiment, the connector processing machine 100 includes a vision system 180 for imaging the connector housings 52 and the covers 56. In an exemplary embodiment, the connector processing machine 100 includes a gate assembly 190 for controlling positioning of the connector housings 52 within the connector processing machine 100.

The feeder mechanism 120 is located above the upper surface 116 of the center mounting plate 114 of the platform 110. The feeder mechanism 120 extends between the punching zone 102 in the loading zone 104. In an exemplary embodiment, the feeder mechanism 120 includes a walking beam 122, a carriage 124, a feeder rail 126, and a feeder actuator 128. The feeder mechanism 120 includes a housing track 130 for supporting and guiding the connector housings 52. The walking beam 122 is configured to engage the connector housings 52 and move the connector housings 52 along the housing track 130 between the loading zone 104 and the punching zone 102. The walking beam 122 is mounted to the carriage 124, which slides along the feeder rail 126. The feeder actuator 128 moves the carriage 124, and thus the walking beam 122, along the feeder rail 126.

The housing track 130 includes one or more beams 132 extending between opposite ends of the housing track 130. In an exemplary embodiment, the housing track 130 extends along a linear path. Optionally, the housing track 130 may be oriented horizontally. In an exemplary embodiment, the housing track 130 extends parallel to the upper surface 116 of the center mounting plate 114. The housing track 130 is spaced apart from the upper surface 116 to position the connector housings 52 at a height above the upper surface 116. The housing track 130 includes a first portion 134 at the loading zone 104 and a second portion 136 at the punching zone 102. The connector housings 52 are loaded onto the first portion 134 of the housing track 130, such as with one or more batches arranged and to bend along the first portion 134 of the housing track 130. The connector housing 52 may be manually loaded or automatically loaded, such as using a robot or other feeding mechanism. The connector housings 52 are configured to slide along the housing track 130 between the first portion 134 and the second portion 136. For example, the walking beam 122 may feed the connector housings 52 along the housing track 130 from the first portion 134 to the second portion 136.

The feeder rail 126 includes one or more rails 140 extending between a first end 142 and a second end 144. The carriage 124 may be slidable along the rails 140 between the first end 142 and the second end 144. Optionally, the carriage 124 may include rollers or other features to reduce friction and control sliding movement of the carriage 124 along the rails 140. The carriage 124 supports the walking beam 122 and moves the walking beam 122 between the loading zone 104 and the punching zone 102. The walking beam 122 is configured to pick up the connector housings 52 at the loading zone 104 when the carriage 124 is retracted to a pickup position (for example, aligned with the first portion 134 of the housing track 130). The walking beam 122 is configured to advance the connector housings 52 to the punching zone 102 when the carriage 124 is advanced to a drop off position (for example, aligned with the second portion 136 of the housing track 130). The housing runners 62 and the cover runners 66 are configured to be removed in the punching zone 102 when the walking beam 122 is at the drop off position. Both punching operations to remove the housing runners 62 and the cover runners 66 may occur at the drop off position without moving or changing positions of the connector housings 52. As such, the connector processing machine 100 may operate efficiently by quickly removing the housing runners 62 and the cover runners 66 before processing the next batch of connector housings 52.

In an exemplary embodiment, the feeder actuator 128 is coupled to the first end 142 of the feeder rail 126. A drive shaft 146 is coupled to the feeder actuator 128 and coupled to the carriage 124. The drive shaft 146 is operated by the feeder actuator 128 to move the carriage 124 along the feeder rail 126. Optionally, the drive shaft 146 may be threaded. For example, the drive shaft 146 may be a drive screw rotatably coupled to the feeder actuator 128. The drive shaft 146 is rotated in a first direction to advance the carriage 124 and is rotated in a second direction to retract to the carriage 124. The rate of rotation of the drive shaft 146 may be controlled to control the sliding speed of the carriage 124 along the feeder rail 126. The positioning of the carriage 124 may be precisely controlled by the feeder actuator 128. In various embodiments, the feeder actuator 128 is an electric motor, such as a servo motor. Other types of actuators may be used in alternative embodiments, such as a hydraulic actuator or a pneumatic actuator.

In an exemplary embodiment, the die assembly 170 includes support dies 172 and a support die actuator 174. The support dies 172 support the connector housings 52 and the covers 56 during the cutting process. The support dies 172 prevent movement of the connector housings 52 and the covers 56 during the cutting process. The support dies 172 may clamp onto the connector housings 52 and/or the covers 56 to hold the connector housings 52 and/or the covers 56. The support die actuator 174 moves the support dies 172 into a supporting position to hold the connector housings 52/covers 56 and moves the support dies 172 to released positions to allow the connector housings 52/covers 56 to move, such as into or out of the punching zone 102. The support die actuator 174 may be an electric actuator, such as a servo motor. The support dies 172 may be moved horizontally and/or vertically to supporting positions.

In an exemplary embodiment, the gate assembly 190 is used to control the positioning of the connector housings 52 along the housing track 130. In an exemplary embodiment, the gate assembly 190 includes one or more gate members 192, such as located at different locations along the housing track 130 to control movement of the connector housings 52 along the housing track 130. In an exemplary embodiment, the gate member 192 located between the first portion 134 and the second portion 136 of the housing track 130. The gate member 192 blocks movement of the connector housings 52 from the first portion 134 to the second portion 136. Another gate member 192 may be located at the downstream end of the second portion 136, such as downstream of the punching zone 102 to prevent removal of the connector housings 52 from the punching zone 102.

In an exemplary embodiment, the gate assembly 190 includes a gate actuator 194 operably coupled to the gate member 192. The gate actuator 194 is operated to move the gate member 192 between a blocking position and a clearance position. In the blocking position, the gate member 192 blocks movement of the connector housings 52 along the housing track 130, such as from the first portion 134 to the second portion 136. The gate member 192 is moved to the clearance position to allow the connector housings 52 to move along the housing track 130, such as from the first portion 134 to the second portion 136. Optionally, the gate member(s) 192 may hold the connector housing 52 at the second portion 136, such as during processing to cut and remove the housing runners 62 and the cover runners 66. For example, the gate member 192 may prevent the connector housings 52 from sliding backwards and/or forward along the housing track 130.

In an exemplary embodiment, the vision system 180 includes a camera 182 having a viewing area aimed at the housing track 130 to image the connector housings 52. The camera 182 is mounted to a mounting bracket 184, which may be mounted to the platform 110. The vision system 180 may include lighting elements to control lighting in the viewing area.

In various embodiments, the camera 182 may image the connector housings 52 at the first portion 134 of the housing track 130. For example, the connector housings 52 may be imaged in the loading zone 104. The connector housings 52 may be imaged prior to removing the housing runners 62 and the cover runners 66. In an exemplary embodiment, the connector housings 52 are imaged as the connector housings 52 are transferred from the loading zone 104 to the punching zone 102. For example, the walking beam 122 may walk the connector housings 52 past the camera 182 such that the camera 182 may image each of the connector housings 52 as the batch of connector housings 52 are moved from the loading zone 104 to the punching zone 102.

In an exemplary embodiment, the vision system 180 processes the images from the camera 182, such as to identify the connector housings 52 and/or to identify defects in the connector housings 52. The vision system 180 may determine the type of housing 52 being processed (for example, single position, two position, three position, for position, five position, fixed position, etc.). The vision system 180 may determine if any of the connector housings 52 have a defect, such as missing material, overfill, flashing, excess housing material, or other types of defects. The vision system 180 may use boundary recognition to identify features of the connector housing 52.

In other various embodiments, the vision system 180 may image the connector housing 52 at other locations. For example, the vision system 180 may image the connector housings 52 at the punching zone 102, such as to verify that the housing runners 62 and the cover runners 66 have been properly removed. Optionally, the vision system 180 may include multiple cameras 182 to image the connector housings 52 from different angles and/or to image the connector housings 52 at different locations, such as in both the loading zone 104 and the punching zone 102.

The housing runner punch assembly 200 is located at the punching zone 102. The housing runner punch assembly 200 includes a housing runner cutter assembly 210 and a housing runner actuator 220 operably coupled to the housing runner cutter assembly 210. The housing runner cutter assembly 210 includes a plurality of housing runner cutters 212 and cutter holders 214 holding the housing runner cutters 212.

In various embodiments, the cutter holders 214 are removable and replaceable to change the housing runner cutters 212. For example, the cutter holders 214 may be removed and replaced to change the number of housing runner cutters 212 and/or the positioning of the housing runner cutters 212. For example, when different batches (for example, single position, two position, three position, for position, five position, fixed position, etc.) of the connector housings 52 are run through the connector processing machine 100, the cutter holders 214 may be removed and replaced depending on the batch of connector housings 52 being run through the connector processing machine 100. As such, the set up of the housing runner punch assembly 200 may be quickly and easily swapped out and changed to minimize downtime of the connector processing machine 100.

In an exemplary embodiment, the housing runner cutter assembly 210 is coupled to the walking beam 122 to create a walking beam/vertical shear assembly. For example, the housing runner cutters 212 are positioned relative to the connector housings 52 by the walking beam 122. The housing runner cutter assembly 210 is movable with the carriage 124.

The housing runner actuator 220 is operated to move the housing runner cutters 212 in a cutting direction 222 to cut the housing runners 62 from between the connector housings 52. In the illustrated embodiment, the cutting direction 222 is a vertical direction. The cutting direction 222 is perpendicular to the upper surface 116 of the center mounting plate 114. The housing runner cutters 212 are moved in a downward cutting direction to cut the housing runners 62. In an exemplary embodiment, the housing runner actuator 220 moves all of the housing runner cutters 212 to simultaneously remove the housing runners 62. However, in alternative embodiments, the housing runner cutters 212 may be independently actuated. The housing runner actuator 220 may be an electric actuator. For example, the housing runner actuator 220 may be a servo motor. Other types of actuators may be used in alternative embodiments, such as a hydraulic actuator or a pneumatic actuator.

In an exemplary embodiment, a position sensor 224 is provided to control operation of the housing runner actuator 220. The position sensor 224 provides feedback to the housing runner actuator 220 to control operation of the housing runner actuator 220. Optionally, the housing runner actuator 220 may have multiple stop positions during processing. For example, the housing runner cutters 212 may be moved to a first position, then stopped, then moved to a second position, before returning to a home position.

In an exemplary embodiment, the housing runner actuator 220 is coupled to the walking beam 122 to control positioning of the walking beam 122 during processing. For example, the housing runner 220 may be operated to lift the walking beam 122 upward and then operated to press the walking beam 122 downward. The downward pressing of the walking beam 122 causes downward motion of the housing runner cutters 212 in the cutting direction 222 to perform the cutting operation on the housing runners 62. The upward lifting of the walking beam 122 may release the walking beam 122 from the connector housings 52 to allow the walking beam 122 to return to the loading zone 104 to pick up a new batch of the connector housings 52. Coupling the walking beam 122 to the housing runner actuator 220 eliminates the need for a separate actuator for the walking beam 122, which reduces overall cost and complexity of the connector processing machine 100.

The cover runner punch assembly 300 is located at the punching zone 102. The cover runner punch assembly 300 includes a cover runner cutter assembly 310 and a cover runner actuator 320 operably coupled to the cover runner cutter assembly 310. The cover runner cutter assembly 310 includes a plurality of cover runner cutters 312 and cutter holders 314 holding the cover runner cutters 312.

In various embodiments, the cutter holders 314 are removable and replaceable to change the cover runner cutters 312. For example, the cutter holders 314 may be removed and replaced to change the number of cover runner cutters 312 and/or the positioning of the cover runner cutters 312. For example, when different batches (for example, single position, two position, three position, for position, five position, fixed position, etc.) of the connector housings 52/covers 56 are run through the connector processing machine 100, the cutter holders 314 may be removed and replaced depending on the batch of connector housings 52/covers 56 being run through the connector processing machine 100. As such, the set up of the cover runner punch assembly 300 may be quickly and easily swapped out and changed to minimize downtime of the connector processing machine 100.

The cover runner actuator 320 is operated to move the cover runner cutters 312 in a cutting direction 322 to cut the cover runners 66 from between the covers 56. In the illustrated embodiment, the cutting direction 322 is a horizontal direction. The cutting direction 322 is parallel to the upper surface 116 of the center mounting plate 114. The cutting direction 322 may be perpendicular to the cutting direction 222 of the housing runner punch assembly 200. The cover runner cutters 312 are moved in the cutting direction 322 to cut the cover runners 66. In an exemplary embodiment, the cover runner actuator 320 moves all of the cover runner cutters 312 to simultaneously remove the cover runners 66. However, in alternative embodiments, the cover runner cutters 312 may be independently actuated. The cover runner actuator 320 may be an electric actuator. For example, the cover runner actuator 320 may be a servo motor. Other types of actuators may be used in alternative embodiments, such as a hydraulic actuator or a pneumatic actuator.

In an exemplary embodiment, a position sensor 324 is provided to control operation of the cover runner actuator 320. The position sensor 324 provides feedback to the cover runner actuator 320 to control operation of the cover runner actuator 320. Optionally, the cover runner actuator 320 may have multiple stop positions during processing. For example, the cover runner cutters 312 may be moved to a first position, then stopped, then moved to a second position, before returning to a home position.

In an exemplary embodiment, the cover runner actuator 320 may be operated independently of the housing runner actuator 220, such as during different punching operations. In various embodiments, the cover runner actuator 320 may be operated in a first punching operation prior to the housing runner actuator 220 to cut the cover runners 66 prior to the housing runners 62. In other embodiments, the housing runner actuator 220 may be operated in a first punching operation prior to the cover runner actuator 320 to cut the housing runners 62 prior to the cover runners 66. In an exemplary embodiment, the feeder mechanism 120 remains stationary during both punching operations such that the connector housings 52 and covers 56 do not move between the first punching operation and the second punching operation.

Figure 5:
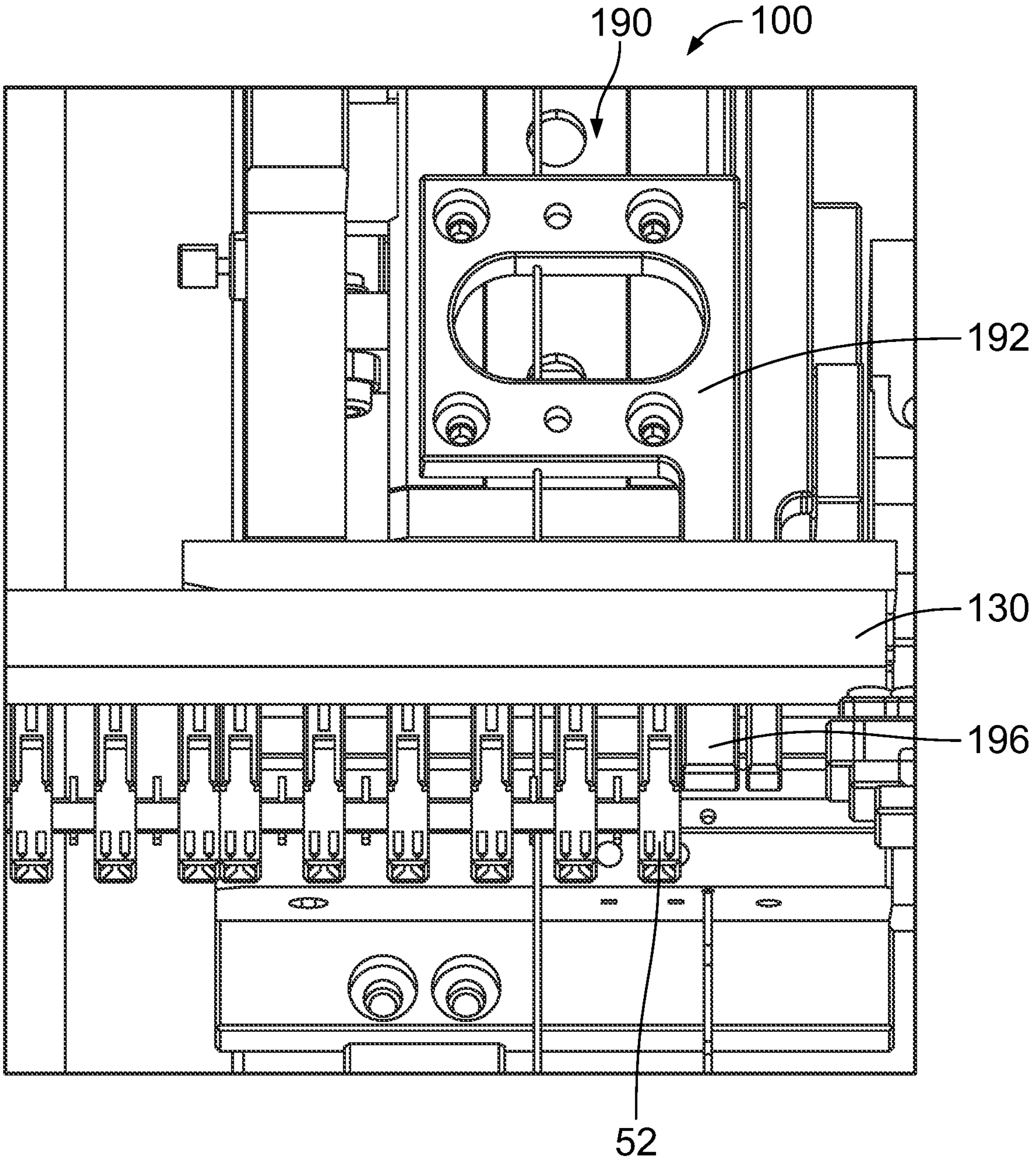
FIG. 5 is a top perspective view of a portion of the connector processing machine showing the gate assembly in accordance with an exemplary embodiment.

FIG. 5 is a top perspective view of a portion of the connector processing machine 100 showing the gate assembly 190 in accordance with an exemplary embodiment. The gate member 192 is shown in the blocking position blocking the connector housings 52 from advancing along the housing track 130. In an exemplary embodiment, the gate member 192 includes a finger 196 positioned in the housing track 130 to physically block the connector housings 52 from moving along the housing track 130. The gate member 192 is movable in a rearward or retracting direction from the blocking position to a clearance position. In the clearance position, the finger 196 is no longer positioned in the housing track 130 and the connector housings 52 are free to move along the housing track 130 to the punching zone 102.

Figure 6:
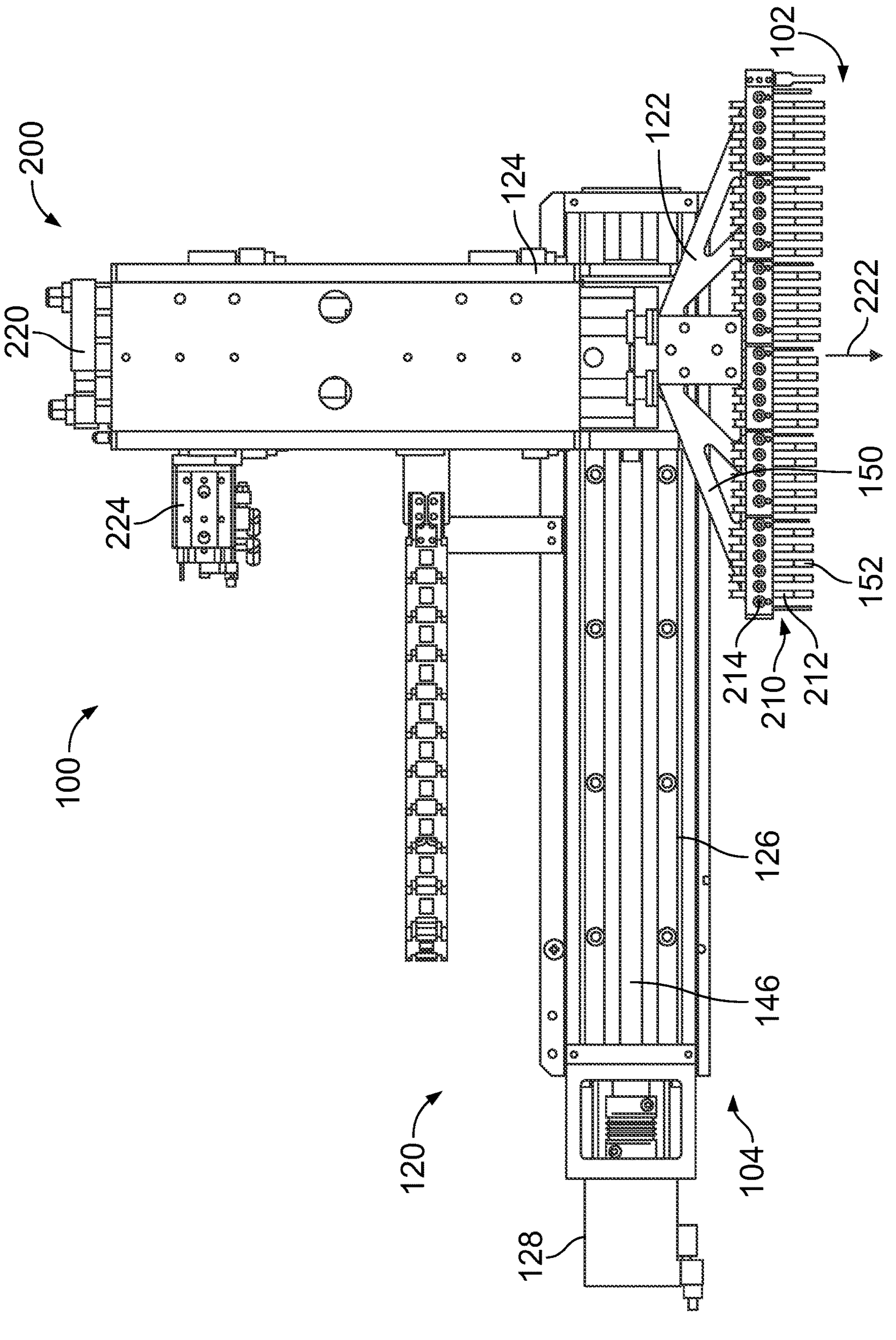
FIG. 6 is a front view of a portion of the connector processing machine in accordance with an exemplary embodiment showing the feeder mechanism.

FIG. 6 is a front view of a portion of the connector processing machine 100 in accordance with an exemplary embodiment showing the feeder mechanism 120. FIG. 6 illustrates the carriage 124 on the feeder rail 126. FIG. 5 illustrates the walking beam 122 coupled to the carriage 124. The feeder actuator 128 is operably coupled to the carriage 124 to move the carriage 124 forward and rearward along a feed axis. For example, the drive shaft 146 may be rotated by the feeder actuator 128 to move the carriage 124 along the feeder rail 126. Movement of the carriage 124 causes movement of the walking beam 122. The connector housings 52 may be advanced to the loading zone 104 by the walking beam 122 and the carriage 124.

In an exemplary embodiment, the carriage 124 supports the housing runner punch assembly 200. For example, the housing runner actuator 220 is coupled to the carriage 124 and movable with the carriage 124. The housing runner cutter assembly 210 is coupled to the walking beam 122 and movable with the walking beam 122. The housing runner cutters 212 may be moved in the cutting direction 222 by the housing runner actuator 220 to cut the housing runners 62 from between the connector housings 52.

In an exemplary embodiment, the walking beam 122 includes a walking beam frame 150 supporting a plurality of fingers 152 configured to engage the corresponding connector housings 52. The walking beam frame 150 is supported by the carriage 124 and is movable in the feeding direction by the carriage 124. The walking beam 122 is movable between the punching zone 102 and the loading zone 104 by the carriage 124. The walking beam frame 150 is movable in a vertical actuation direction and is movable in a horizontal feeding direction. For example, the walking beam frame 150 is coupled to the actuator 220 to move vertically downward from a retracted position, to an advanced position, and to a cutting position before returning upward to the retracted position. The walking beam frame 150 is moved downward in the vertical actuation direction from the retracted position to the advanced position to engage the connector housings 52, such as for transferring the connector housings 52 from the loading zone 104 to the punching zone 102. The walking beam frame 150 is moved downward in the vertical actuation direction from the advanced position to the cutting position to cut the housing runners 62 from between the connector housings 52. The walking beam frame 150 is moved upward from the cutting position to the retracted position to release from the connector housings 52 and allow a return to the loading zone 104 to gather a new batch of the connector housings 52.

In an exemplary embodiment, the fingers 152 are part of the holders 214 and are removable from the walking beam frame 150 or replacement by a different holder having a different arrangement of the fingers 152. For example, different sets of the holders 214 may be provided for the different configurations of the connector housings. The number and spacing of the fingers 152 may be different for the different holders 214. In an exemplary embodiment, the housing runner cutters 212 are associated with the fingers 152. For example, each finger 152 includes a corresponding housing runner cutter 212 extending along such finger 152. The distal ends of the fingers 152 extend beyond the cutting ends of the housing runner cutters 212. The distal ends of the fingers 152 may initially engage the connector housings 52 to move the connector housings 52 from the pickup position to the drop off position at the punching zone 102. When the housing runner punch assembly 200 is operated, the walking beam 122 is moved downward in the vertical actuation direction to move the housing runner cutters 212 to the cutting position to cut the housing runners 62. The position sensor 224 controls the vertical positioning of the walking beam 122 between the retracted position, the advanced position, and the cutting position.

Figure 7:
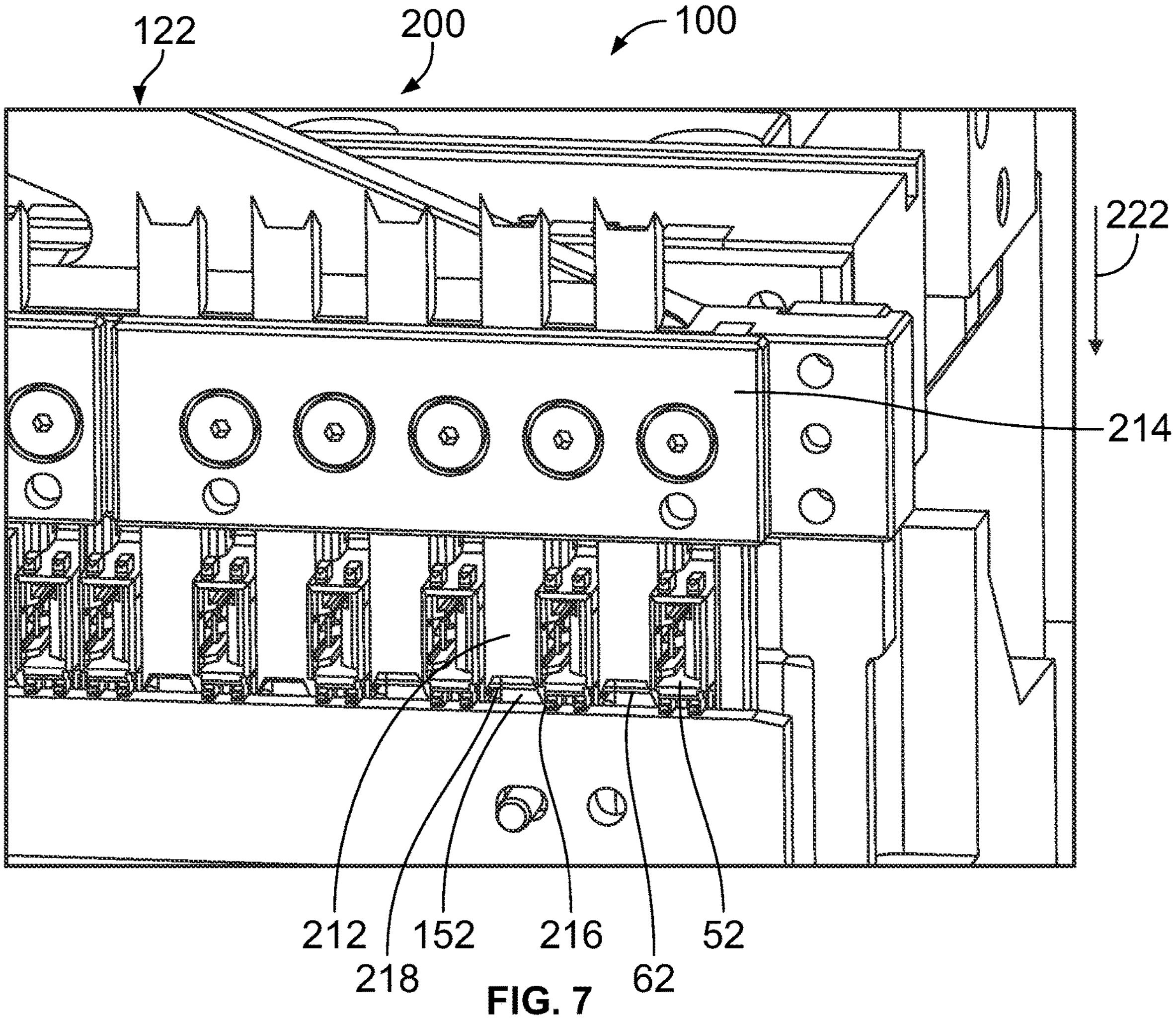
FIG. 7 is a front perspective view of a portion of the connector processing machine in accordance with an exemplary embodiment showing the housing runner punch assembly positioned for removal of the housing runners from the connector housings.

FIG. 7 is a front perspective view of a portion of the connector processing machine 100 in accordance with an exemplary embodiment showing the housing runner punch assembly 200 positioned for removal of the housing runners 62 from the connector housings 52. In the illustrated embodiment, the single-position connector housings 52 are illustrated. The cutter holders 214 correspond to the signal position connector housings 52 provided the appropriate number and spacing of fingers 152 and housing runner cutters 212. However, the number and spacing of the fingers 152 and the housing runner cutters 212 are different for the multi-position connector housings 52 (FIG. 2). The fingers 152 of the walking beam 122 are located between each of the connector housings 52. The housing runner cutters 212 extend along the fingers 152 and are positioned between each of the connector housings 52 to remove the housing runners 62 between the connector housings 52.

In an exemplary embodiment, each housing runner cutter 212 includes a first cutting edge 216 and a second cutting edge 218 at opposite sides of the housing runner cutter 212. The cutting edges 216, 218 are configured to cut through the housing runner 62 to remove the housing runner 62 from the connector housings 52. The walking beam 122 is movable in a downward direction to move each of the housing runner cutters 212 in the cutting direction 222. As such, each of the housing runners 62 may be simultaneously cut from the connector housings 52.

Figure 8:
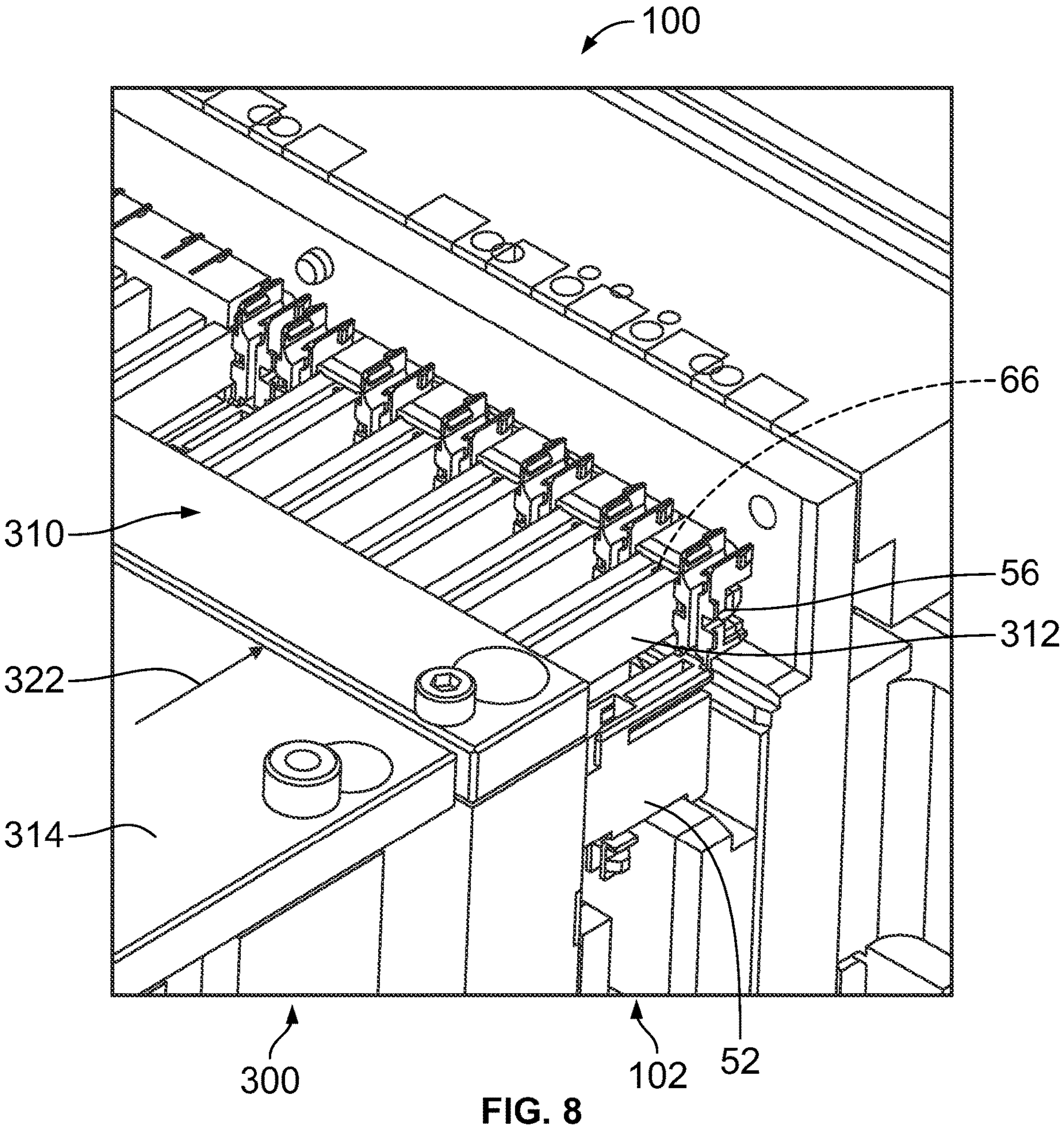
FIG. 8 is a front perspective view of a portion of the connector processing machine in accordance with an exemplary embodiment showing the cover runner punch assembly positioned for removal of the cover runners from the covers.

FIG. 8 is a front perspective view of a portion of the connector processing machine 100 in accordance with an exemplary embodiment showing the cover runner punch assembly 300 positioned for removal of the cover runners 66 from the covers 56. In the illustrated embodiment, the single-position connector housings 52 are illustrated. The cutter holders 314 correspond to the signal position connector housings 52 provided the appropriate number and spacing of cover runner cutters 312. However, the number and spacing of the cover runner cutters 312 are different for the multi-position connector housings 52 (FIG. 2). In an exemplary embodiment, the walking beam 122 (FIG. 7) is moved out of the punching zone 102 to provide access to the cover runners 66.

The cover runner cutter assembly 310 includes the cutter holders 314 holding the cover runner cutters 312. The cutter holders 314 are removable and replaceable to change the number of cover runner cutters 312 and/or the positioning of the cover runner cutters 312. The cover runner cutters 312 are moved in the cutting direction 322 to cut the cover runners 66 from between the covers 56. In an exemplary embodiment, the cover runner actuator 320 moves all of the cover runner cutters 312 to simultaneously remove the cover runners 66.

Figure 9:
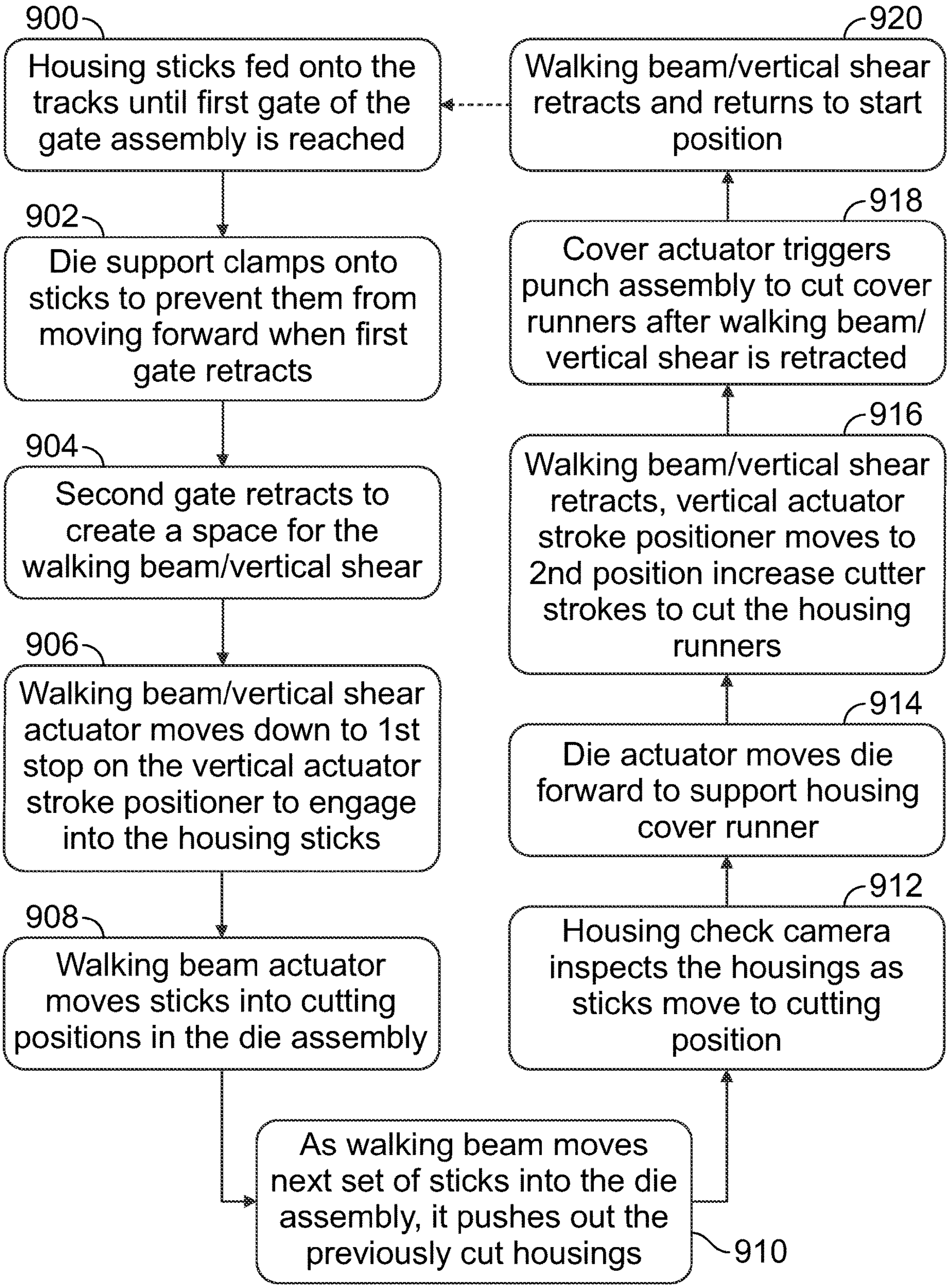
FIG. 9 is a flow chart of a method of processing connector housings in accordance with an exemplary embodiment.

FIG. 9 is a flow chart of a method of processing connector housings in accordance with an exemplary embodiment. At 900, housing sticks are fed onto the housing tracks until the housing sticks reach a first gate of the gate assembly. At 902 the die supports clamps onto the housing sticks to prevent the housing sticks from moving forward when first gate retracts. At 904, a second gate of the gate assembly retracts to create a space for the walking beam/vertical shear assembly.

At 906, the walking beam/vertical shear actuator moves down to a first stop on the vertical actuator stroke positioner to engage into the housing sticks. At 908, the walking beam actuator moves the housing sticks into cutting positions in the punching zone. At 910, as the walking beam moves the next set of housing sticks into the die assembly, the previously cut connector housings are pushed out of the punching zone. At 912, as the housing sticks move to the cutting positions, the camera inspects the connector housings.

At 914, the support die actuator moves the support die forward to support the connector housings and/or the housing runners and/or the cover runners. At 916, the walking beam/vertical shear retracts and the actuator moves to a second position to increase cutter strokes to cut the housing runners. At 918, the cover runner punch assembly triggers the cover runner actuator to cut the cover runners after the walking beam/vertical shear is retracted. At 920, the walking beam/vertical shear retracts and returns to the start position.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms “including” and “in which” are used as the plain-English equivalents of the respective terms “comprising” and “wherein.” Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A connector processing machine for processing connector housings of connector assemblies, the connector processing machine comprising:

a platform having a punching zone;

a feeder mechanism coupled to the platform, the feeder mechanism including a housing track for supporting and guiding the connector housings between a loading zone and the punching zone, the feeder mechanism including a feeder rail and a carriage sliding along the feeder rail, the feeder mechanism including a feeder actuator coupled to the carriage to slide the carriage along the feeder rail between a pickup position and a drop off position, the feeder mechanism including a walking beam coupled to the carriage and movable by the carriage between the loading zone and the punching zone, the walking beam including fingers configured to engage the connector housings to advance the connector housings along the housing track from the loading zone to the punching zone; and a punch assembly coupled to the platform at the punching zone, the punch assembly including a cutter assembly and an actuator operably coupled to the cutter assembly, the cutter assembly being coupled to the walking beam and movable with the walking beam, the cutter assembly including cutters configured to cut housing runners between the connector housings to separate the connector housings from each other.

2. The connector processing machine of claim 1, wherein the cutters extend along the fingers and are movable relative to the fingers.

3. The connector processing machine of claim 1, wherein the cutter assembly is coupled to the walking beam, the actuator moving the walking beam and the cutter assembly relative to the connector housings in a cutting direction.

4. The connector processing machine of claim 1, further comprising a cover runner punch assembly at the punching zone, the cover runner punch assembly including a cover runner cutter assembly and a cover runner actuator operably coupled to the cover runner cutter assembly, the cover runner cutter assembly including cover runner cutters configured to cut cover runners between covers of the connector housings to separate the covers from each other.

5. The connector processing machine of claim 4, wherein the actuator moves the cutters in a first cutting direction and the cover runner actuator moves the cover runner cutters in a second cutting direction perpendicular to the first cutting direction.

6. The connector processing machine of claim 4, wherein the punch assembly is operated during a first punching operation and the cover runner punch assembly is operated during a second punching operation, the feeder mechanism remaining stationary such that the connector housings are unmoved between the first punching operation and the second punching operation.

7. The connector processing machine of claim 4, wherein the cutters are movable relative to the fingers to cut the housing runners and the cover runner cutters are movable relative to the fingers to cut the cover runners.

8. The connector processing machine of claim 4, wherein the cutters are movable perpendicular to an upper surface of a center mounting plate of the platform during the cutting operation and wherein the cover runner cutters are movable parallel to the upper surface of the center mounting plate during the cutting operation.

9. The connector processing machine of claim 1, wherein the punch assembly further comprises a support die configured to engage and hold the connector housings during actuation of the cutters.

10. The connector processing machine of claim 1, further comprising a vision system including a camera configured to image the connector housings prior to removal of the housing runners.

11. The connector processing machine of claim 1, further comprising a gate assembly at the loading zone, the gate assembly including a gate member movable between a blocking position and a clearance position, the gate member blocking movement of the connector housings along the housing track in the blocking position, the walking beam allowed to move the connector housings along the housing track when the gate member in the clearance position.

12. A connector processing machine for processing connector housings of connector assemblies, the connector processing machine comprising:

a platform having a center mounting plate including a punching zone above the center mounting plate;

a feeder mechanism coupled to the platform, the feeder mechanism including a housing track for supporting and guiding the connector housings between a loading zone and the punching zone, the feeder mechanism including a feeder rail and a carriage sliding along the feeder rail, the feeder mechanism including a feeder actuator coupled to the carriage to slide the carriage along the feeder rail between a pickup position and a drop off position, the feeder mechanism including a walking beam coupled to the carriage and movable by the carriage between the loading zone and the punching zone, the walking beam including fingers configured to engage the connector housings to advance the connector housings along the housing track from the loading zone to the punching zone;

a housing runner punch assembly at the punching zone, the housing runner punch assembly including a housing runner cutter assembly and a housing runner actuator operably coupled to the housing runner cutter assembly, the housing runner cutter assembly being coupled to the walking beam and movable with the walking beam, the housing runner cutter assembly including housing runner cutters configured to cut housing runners between the connector housings to separate the connector housings from each other; and a cover runner punch assembly at the punching zone, the cover runner punch assembly including a cover runner cutter assembly and a cover runner actuator operably coupled to the cover runner cutter assembly, the cover runner cutter assembly including cover runner cutters configured to cut cover runners between covers of the connector housings to separate the covers from each other.

13. The connector processing machine of claim 12, wherein the housing runner cutter assembly is coupled to the walking beam, the housing runner actuator moving the walking beam and the housing runner cutter assembly relative to the connector housings in a cutting direction.

14. The connector processing machine of claim 12, wherein the housing runner actuator moves the housing runner cutters in a first cutting direction and the cover runner actuator moves the cover runner cutters in a second cutting direction perpendicular to the first cutting direction.

15. The connector processing machine of claim 12, wherein the housing runner punch assembly is operated during a first punching operation and the cover runner punch assembly is operated during a second punching operation, the feeder mechanism remaining stationary such that the connector housings are unmoved between the first punching operation and the second punching operation.

16. The connector processing machine of claim 12, wherein the cover runner cutters are movable relative to the fingers to cut the cover runners and the housing runner cutters are movable relative to the fingers to cut the housing runners.

17. The connector processing machine of claim 12, wherein the housing runner cutters are movable perpendicular to an upper surface of the center mounting plate during the cutting operation and wherein the cover runner cutters are movable parallel to the upper surface of the center mounting plate during the cutting operation.

18. A method of processing connector assemblies having connector housings with covers connected by housing runners and cover runners, the method comprising:

loading batches of the connector housings onto a housing track at a loading zone;

moving a walking beam to the loading zone and engaging the connector housings with fingers of the walking beam;

moving a carriage supporting the walking beam on a feeder rail from the loading zone to a punching zone;

cutting the cover runners from between the covers using a cover runner punch assembly to separate the covers from each other; and cutting the housing runners from between the connector housings using a housing runner punch assembly to separate the connector housings from each other.

19. The method of claim 18, wherein said cutting the housing runners comprises moving housing runner cutters along the fingers to cut the housing runners.

20. The method of claim 18, wherein said cutting the cover runners occurs at the punching zone and wherein said cutting the housing runners occurs at the punching zone without moving the connector housings between said cutting the cover runners and said cutting the housing runners.

* * * * *